(12) United States Patent
Ma et al.

(10) Patent No.: US 10,579,568 B2
(45) Date of Patent: Mar. 3, 2020

(54) NETWORKED STORAGE SYSTEM WITH ACCESS TO ANY ATTACHED STORAGE DEVICE

(71) Applicant: Intel Corporation, Santa Clara, CA (US)

(72) Inventors: Taufik Ma, Portland, OR (US); Sujith Arramreddy, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/026,611

(22) Filed: Jul. 3, 2018

(65) Prior Publication Data

US 2019/0018814 A1 Jan. 17, 2019

Related U.S. Application Data

(60) Provisional application No. 62/528,437, filed on Jul. 3, 2017.

(51) Int. Cl.
*G06F 13/40* (2006.01)
*G06F 9/445* (2018.01)
*G06F 13/42* (2006.01)

(52) U.S. Cl.
CPC ...... *G06F 13/4022* (2013.01); *G06F 9/44505* (2013.01); *G06F 13/4282* (2013.01); *G06F 2213/0026* (2013.01)

(58) Field of Classification Search
CPC ............. G06F 13/4022; G06F 9/44505; G06F 13/4282
See application file for complete search history.

(56) References Cited

U.S. PATENT DOCUMENTS

| | | | | |
|---|---|---|---|---|
| 2012/0185643 | A1* | 7/2012 | Dekoning | G06F 3/0607 711/114 |
| 2014/0337540 | A1* | 11/2014 | Johnson | G06F 13/14 710/5 |
| 2015/0006663 | A1* | 1/2015 | Huang | G06F 13/4221 709/213 |

(Continued)

*Primary Examiner* — Tim T Vo
*Assistant Examiner* — Phong H Dang
(74) *Attorney, Agent, or Firm* — Compass IP Law PC

(57) ABSTRACT

In one embodiment, a networked system includes network interface ports to couple to a computer data network, PCIe devices, bridge devices coupled to network interface ports, a PCIe network switch coupled between bridge devices and PCIe devices, and a configuration device communicatively coupled to bridge devices and PCIe devices. Ports transmit outgoing and receive incoming network traffic. PCIe devices support a function of the computer data network. Each bridge device receives incoming network traffic portions and transmits outgoing network traffic portions through a respective network interface port. PCIe network switch routes PCIe packets between the plurality of bridge devices and the plurality of PCIe devices. Configuration device configures and initializes the PCIe devices for commands and operations that originate from the bridge devices. Configuration device and the bridge devices collaborate together to provide multiple communication paths between the network ports and the plurality of PCIe devices to provide any-to-any connectivity.

20 Claims, 16 Drawing Sheets

Example of networked system WITH "any-to-any capability" using multiple, collaborative configuration and bridge devices

(56) References Cited

U.S. PATENT DOCUMENTS

| | | | |
|---|---|---|---|
| 2015/0324118 A1* | 11/2015 | McCambridge | G06F 3/0613 |
| | | | 710/5 |
| 2016/0127492 A1* | 5/2016 | Malwankar | H04L 67/2842 |
| | | | 709/212 |
| 2016/0335209 A1* | 11/2016 | Jau | G06F 13/36 |
| 2017/0149920 A1* | 5/2017 | Sammatshetti | H04L 67/2842 |
| 2017/0357609 A1* | 12/2017 | Long | G06F 13/16 |
| 2018/0173652 A1* | 6/2018 | Olarig | G06F 13/1668 |

* cited by examiner

Example of NVM Storage System WITH "any-to-any capability" using a single computing sub-system

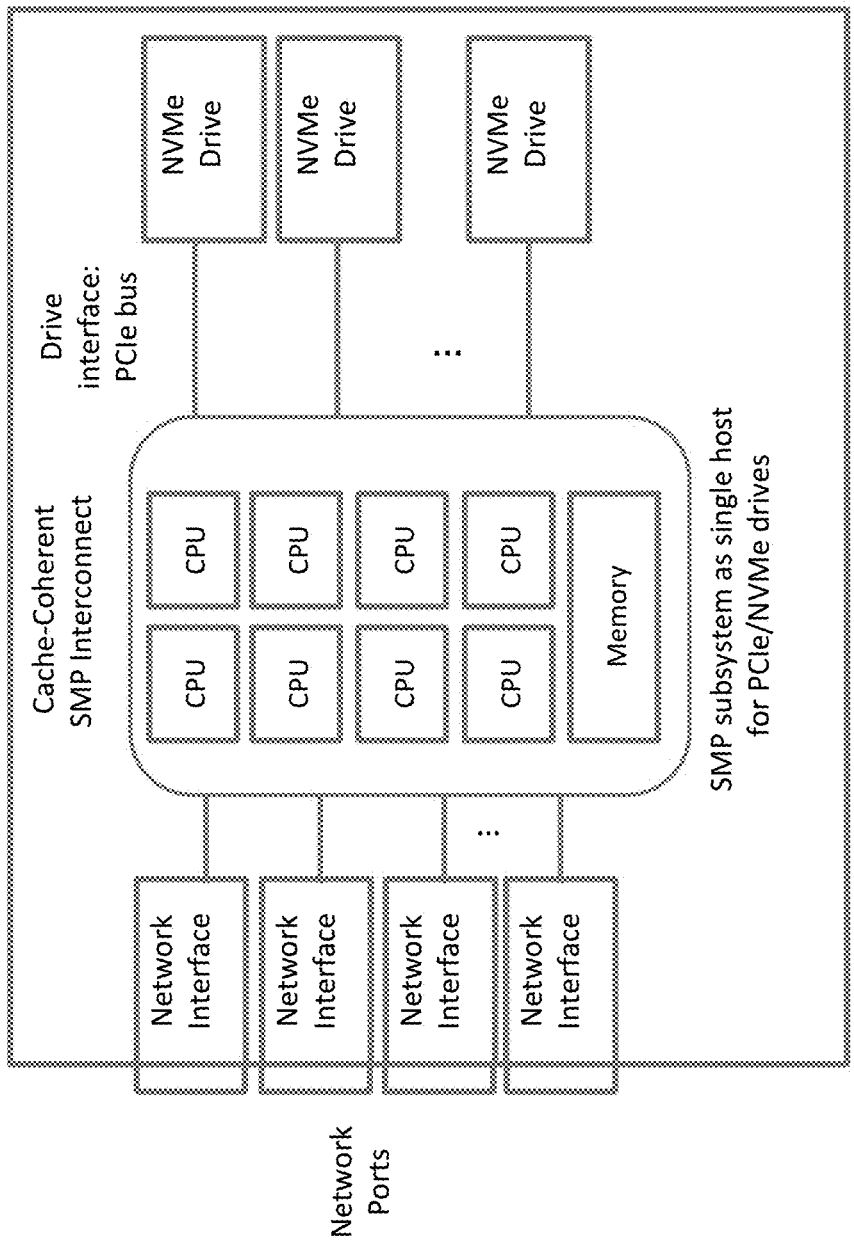

Example of networked system WITH "any-to-any capability" using multiple, collaborative configuration and bridge devices Example of networked system WITH
"any-to-any capability" using multiple, collaborative common configuration/bridge devices

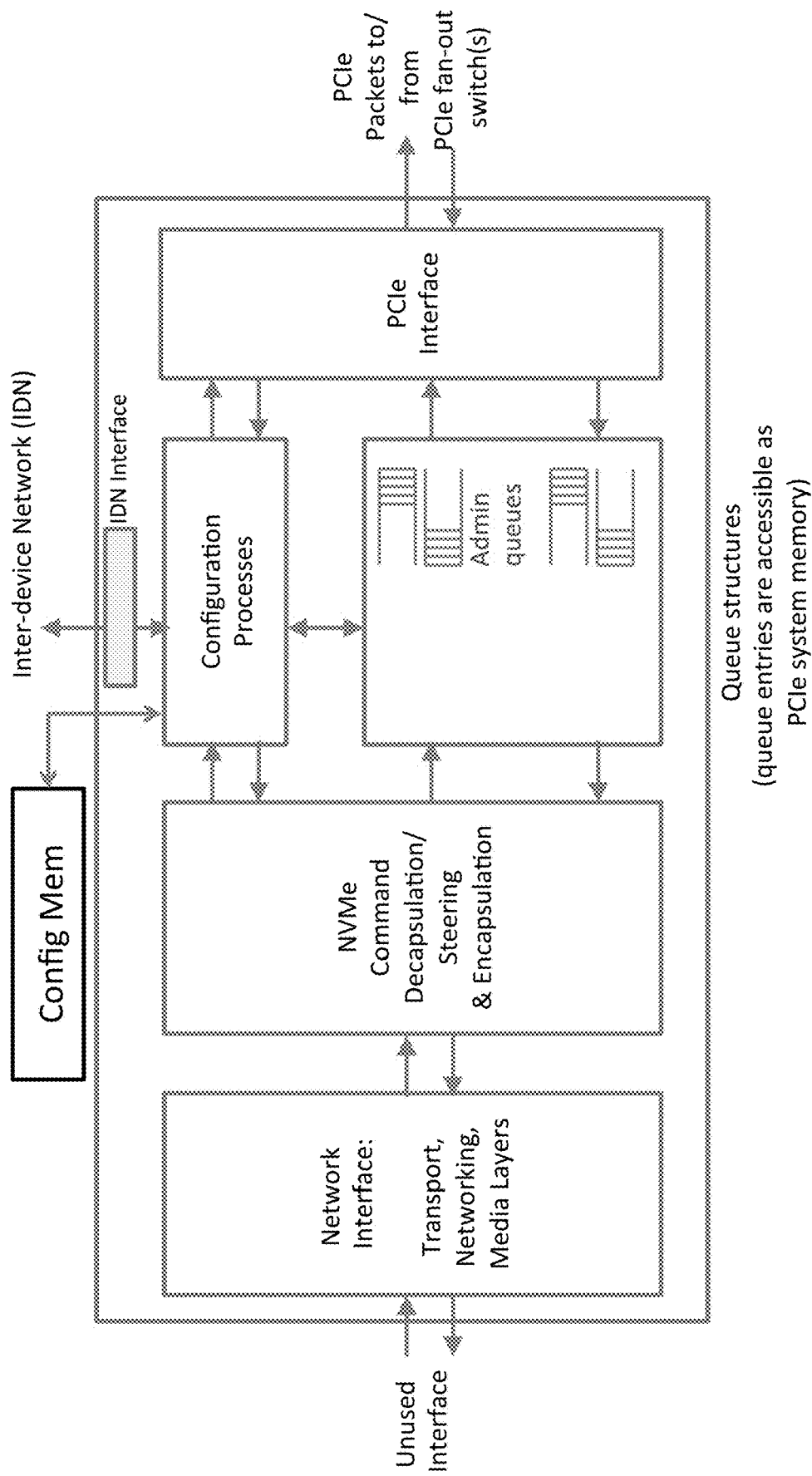
Figure 7A (Config. Device)

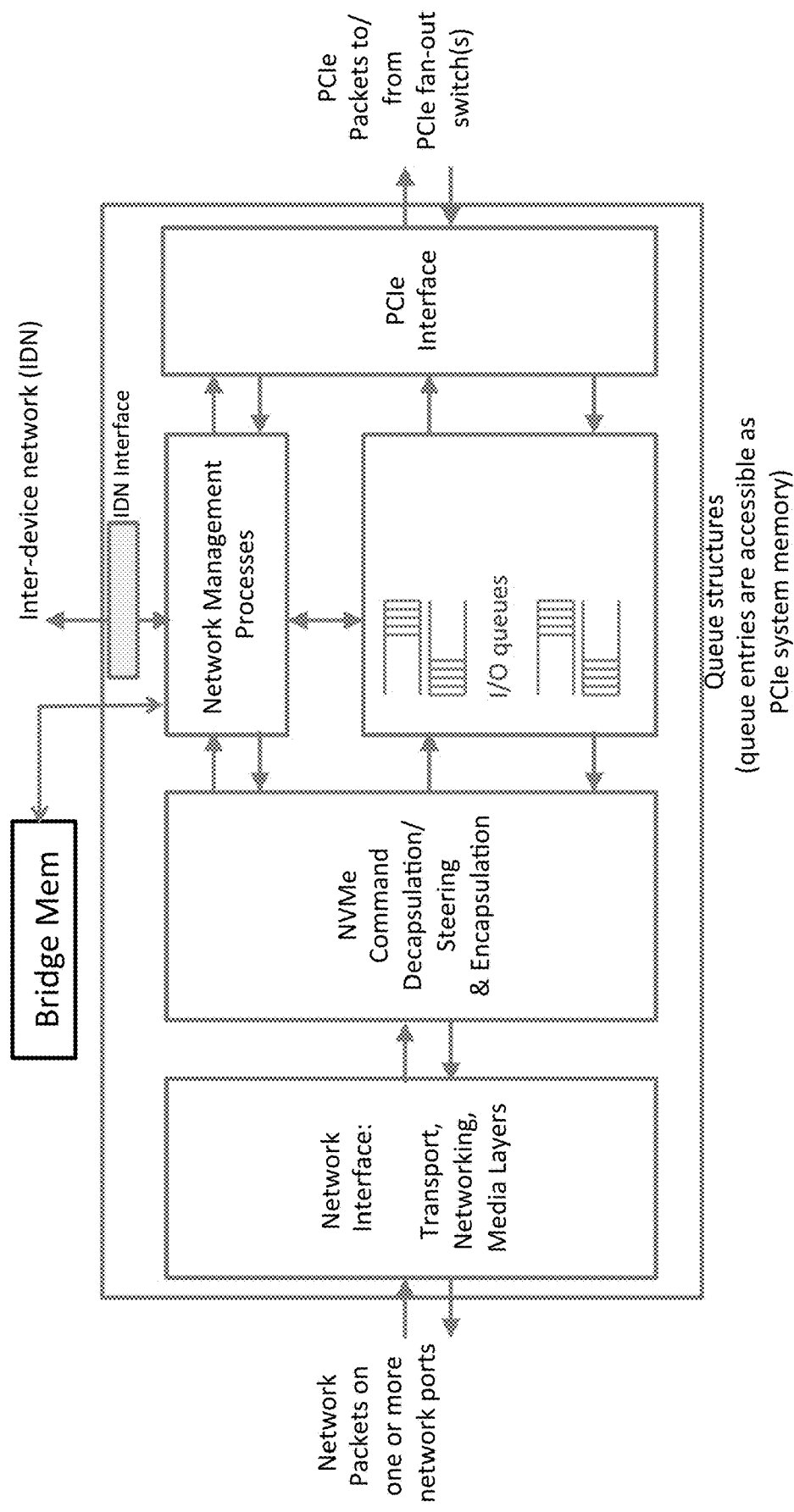
Figure 7B (Bride Device Config.)

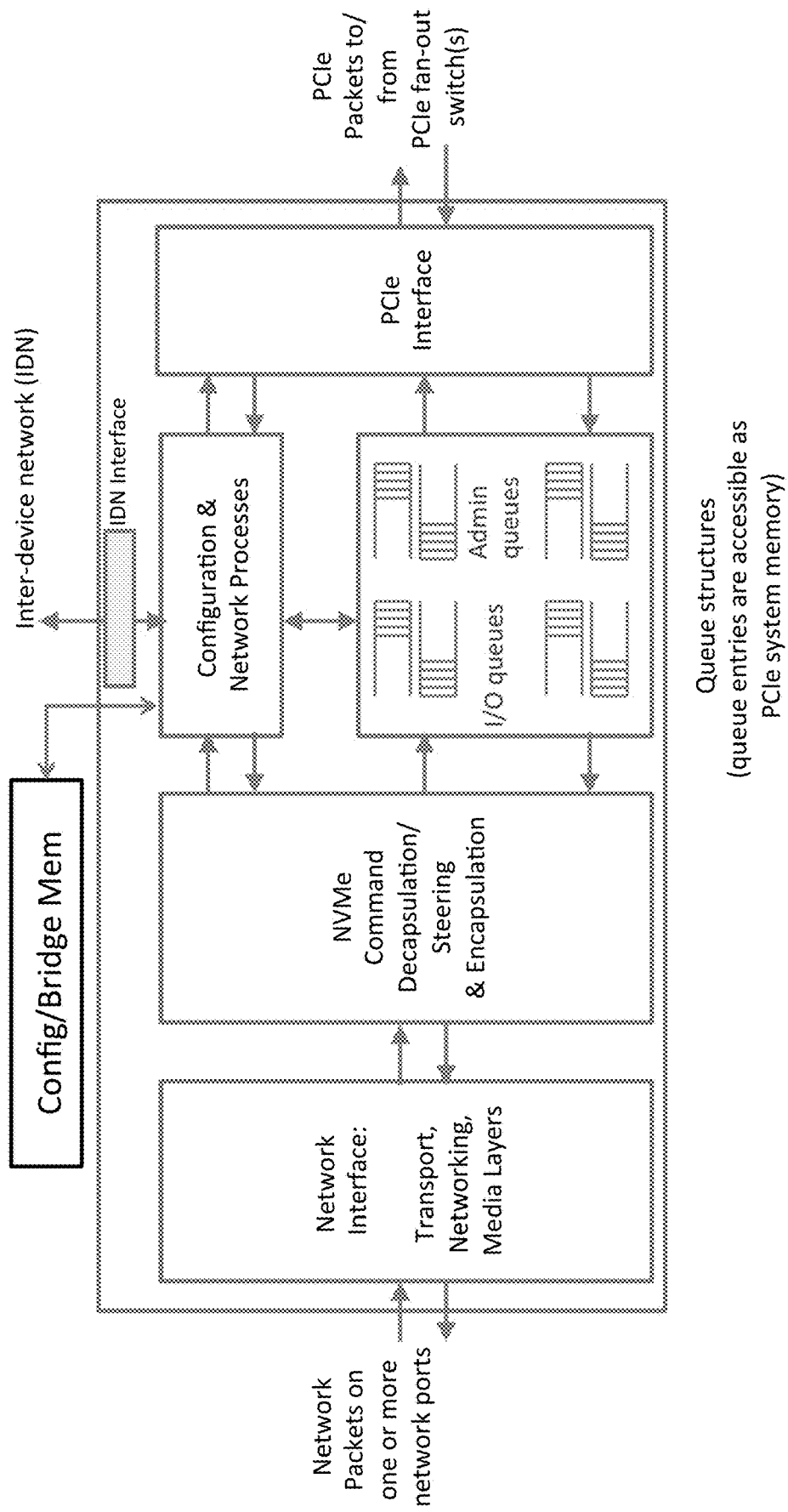
Figure 7C (Config. & Bridge Device)

NETWORKED STORAGE SYSTEM WITH ACCESS TO ANY ATTACHED STORAGE DEVICE

CROSS-REFERENCE TO RELATED APPLICATIONS

This non-provisional United States (U.S.) patent application claims the benefit of U.S. Provisional Patent Application No. 62/528,437 filed on Jul. 3, 2017 by inventors Taufik Ma et al., titled NETWORKED STORAGE SYSTEM WITH ACCESS TO ANY ATTACHED STORAGE DEVICE.

FIELD

The embodiments of the invention relate generally to providing access to network data storage systems in a computer data network.

BACKGROUND

A computer data network often has client computers and server computers coupled in communication together by a data communication network. The server computers or other networked storage devices can include storage drives to store data. However, access to the storage drives by client computers and other devices attached to the data communication network can be less efficient that desired. Improvements can be made to networked storage systems and computer servers to improve the efficiency and performance of the access to the storage drives.

BRIEF SUMMARY

The embodiments of the invention are summarized by the claims that follow below.

BRIEF DESCRIPTIONS OF THE DRAWINGS

FIG. 4A is a functional block diagram showing how a networked NVMe storage system can be implemented with a symmetric multi-processing (SMP) system executing software to provide any-to-any connection capability.

FIG. 7A is a functional block diagram of a collaborative switching device (an integrated circuit-field programmable gate array) programmed to be a configuration integrated circuit (IC) device by an external memory device.

FIG. 7B is a functional block diagram of a collaborative switching device (an integrated circuit-field programmable gate array) programmed to be a combined configuration and bridge device by an external memory device.

FIG. 7C is a functional block diagram of a collaborative switching device (an integrated circuit-field programmable gate array) programmed to be a bridge device by an external memory device.

DETAILED DESCRIPTION

In the following detailed description of the embodiments of the invention, numerous specific details are set forth in order to provide a thorough understanding. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

Figure 1A:
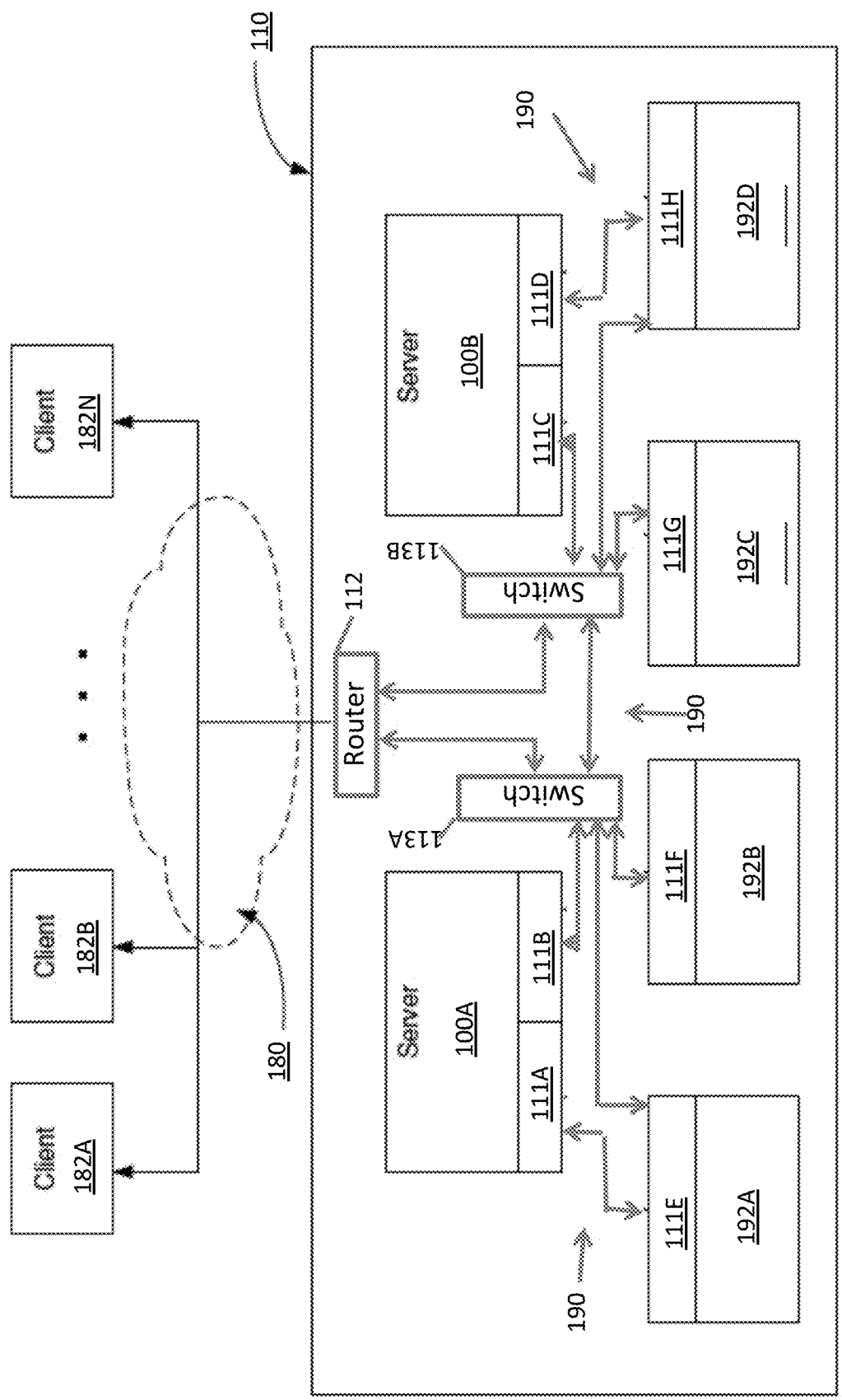
FIG. 1A is a block diagram of an exemplary computer networking system with a data center having a networked NVMe storage system with multiple NVMe devices.

FIG. 1A is a block diagram that illustrates an exemplary computer networking system with a data center network system 110. The data center network system 110 includes one or more server systems 100A-100B, one or more network data storage systems 192A-192D, one or more routers 112, and one or more switches 113A-113B coupled in communication together by a physical communication network 190 (e.g., Ethernet, Fibre-Channel, InfiniBand, and combinations thereof) using message packets in the format of one or more different types of transport protocols (e.g., TCP/IP, FC, RDMA). The one or more server systems 100A-100B and one or more network data storage systems 192A-192D may be collectively referred to herein as networked systems.

The one or more routers 112, the one or more switches 113A-113B, and the physical network couple the data center network system 110 to a wide area network (WAN) 180, such as the world wide web (WWW) or internet. One or more remote client computers 182A-182N may be coupled in communication with the one or more servers 100A-100B of the data center network system 110 on the wide area network (WAN) 180 through the one or more routers 112, the one or more switches 113A-113B, and the physical communication network 190.

Each server can communicate message packets to another server and/or to one or more of the network data storage systems 192A-192D by a direct connection with the physical communication network 190 or through indirect connections by way of one or more switches 113A-113B and the physical communication network 190. Accordingly, multiple computer server systems can access the same network data storage system.

To support the communication of message packets, the one or more servers 100A-100B may each include one or more network bridge devices 111A-111B, 111C-111D, also collectively referred to herein by the reference number 111. Likewise, to support the communication of the message packets, each of the one or more network data storage systems 192A-192D includes at least one bridge device 111E-111H, respectively. The bridge devices 111 further described herein, such as with reference to FIG. 5 for example, can improve the performance and data throughput of the one or more servers 100A-100B and the one or more network data storage systems 192A-192D.

Each of the one or more network data storage systems (NSD) 192A-192D includes a storage capacity of one or more storage devices (e.g., hard disk drive, solid state drive, optical drive) that can store data. The data stored in the storage devices of each of the one or more network data storage systems (NSD) 192A-192D may be accessed by software applications, such as a database application. A client computer in the data center network system may optionally include a network interface controller (not shown in FIG. 1A) and execute software applications to communicate message packets with the network data storage systems 192A-192D.

A computer server system generally includes memory and one or more processors to perform computer processes, and the bridge device 111 to couple to a computer data network, such as a local area network (LAN) or a wide area network (WAN). A networked data storage system 192A-192B includes one or more storage devices and the bridge device 111 to couple to a computer data network, such as a local area network (LAN) or a wide area network (WAN). Computer data is persistently saved and retrieved to and from the computer server system and or the networked data storage system, such as by client computers (e.g., client computers 182A-182N) that are in communication with the computer data network. Storage devices may also be included within a computer server system to increase storage capacity of a date network. A plurality of subsystem storage components—storage devices—that house the media that stores the computer data can be found in the computer data network 110. Storage devices include but are not limited to magnetic hard disk drives, optical disk drives, solid state storage drives (SSDs), and non-volatile memory cards available over a physical computer bus interface, such as a peripheral component interconnect express (PCIe) interface.

PCIe is a high-speed serial computer expansion bus standard for connecting a PCIe device (or an NVMe device) to a printed circuit board such as a motherboard of a computer server. The storage devices can operate with a common instruction set of storage commands accounting for latency and concurrency, such as a non-volatile memory express (NVMe) command set, are referred to herein as NVMe devices. NVMe is a logical device interface specification for accessing storage media attached by means of a PCIe bus.

Figure 1B:
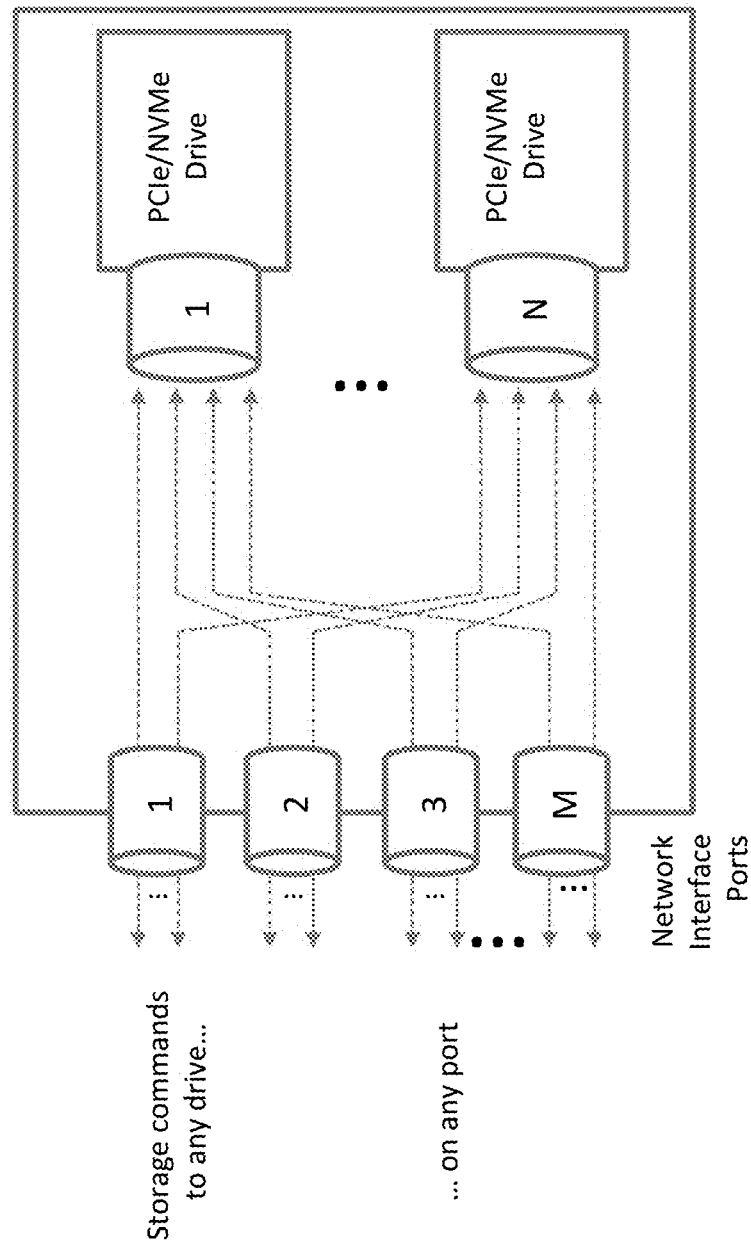
FIG. 1B is a functional block diagram illustrating an any-to-any connection capability between multiple network ports and multiple NVMe devices within a networked NVMe storage system.

Referring now to FIG. 1B, to increase performance and throughput of data accesses, the networked data storage system typically includes a plurality of network ports of a bridge device that attaches the system to the network. Commands and/or data may arrive at any network port to which the system is attached to the network. Regardless of which network port, these commands/data is able to access any storage device in the storage system to provide optimal performance. The storage device should responds to commands and/or data from any network port. This multiple access or multiple connection capability of the system and storage device is referred to herein as any-to-any access capability or any-to-any capability. With any-to-any access capability, any network port of the networked data storage system can access any or all attached storage devices. If a network port fails, the remaining functional ports can still function to provide access to any or all attached storage devices.

Figure 2B:
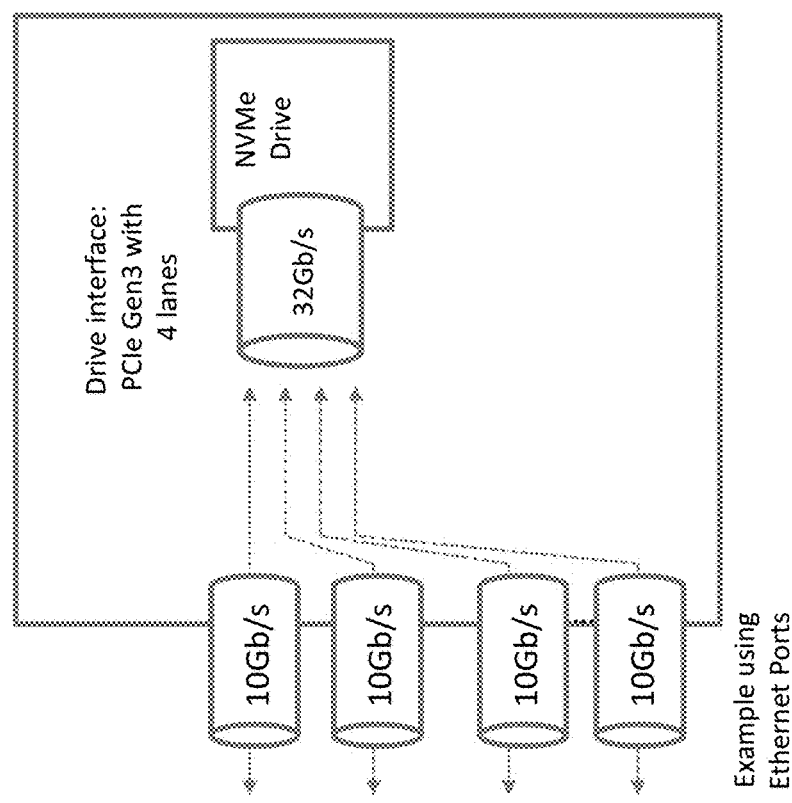
FIG. 2B is a functional block diagram illustrating an advantage of any-to-any connection capability and how it improves performance in a networked NVMe storage system
Figure 2A:
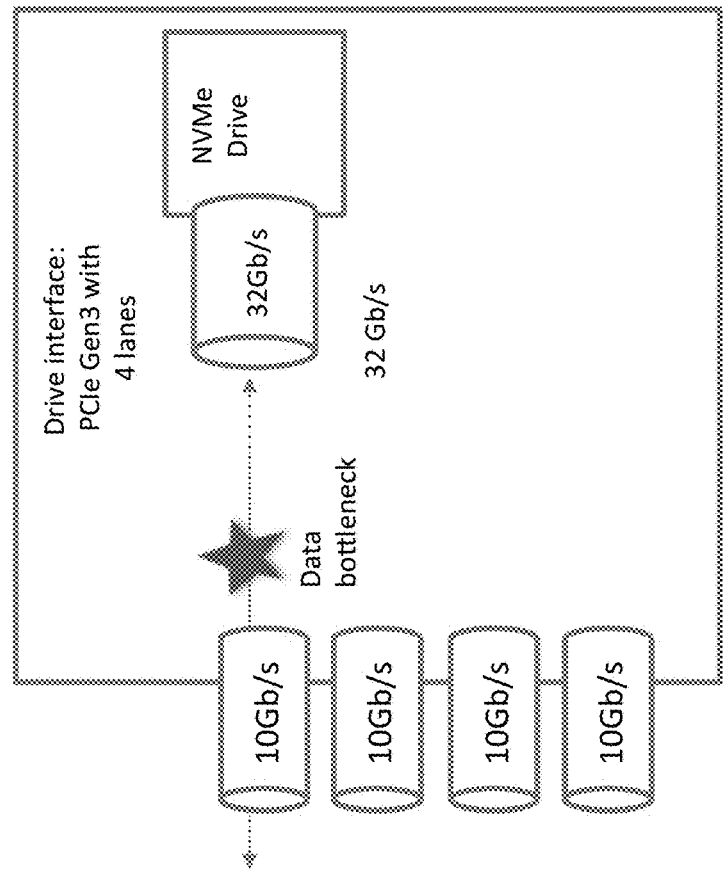
FIG. 2A is a functional block diagram illustrating a disadvantage of a networked NVMe storage system without any-to-any connection capability.

Referring now to FIGS. 2A-2B, any-to-any access capability is useful in a number of usage scenarios of the networked data storage system. In FIG. 2A, without any to any access capability, the throughput of one or more storage devices can exceed that of a single network port. The network port becomes a data bottleneck. In FIG. 2B, with any to any access capability, client accesses to the storage devices can be spread across multiple network ports to avoid sub-optimal performance. On the other hand, even if the throughput of a single network port exceeds that of a storage device, the aggregate throughput of all storage devices may still exceed the aggregate throughput of the single network port. In this case, optimal performance and network port utilization is achieved with any-to-any access capability when data traffic from all the storage devices can be spread across any and all of the network ports of the networked data storage system.

The computer data network that the networked data storage system is attached to can be one of several types of physical networks (e.g., Ethernet, Fibre-Channel, Infini-Band) and can use different types of transport protocols (TCP/IP, FC, RDMA) and storage protocols (SAS, iSCSI, NVMf). These networks are designed for an arbitrary number of peer computers utilizing the network. By comparison, high performance storage devices (e.g., NVMe storage devices) use a PCI-Express (PCIe) interface that is optimized for memory-accesses and are traditionally accessed by just a single computing system. These storage devices with the PCIe interface operate by using a command set that is optimized for latency and concurrency called the NVMe command set. To provide any-to-any access capability, the NVMe command set can be advantageously used. For any-to-any capability, when storage traffic arrives at a given network port—in addition to terminating the transport layer and extracting the NVMe storage commands—the storage system routes the storage traffic to the appropriate storage devices' PCIe interface.

Figure 3:
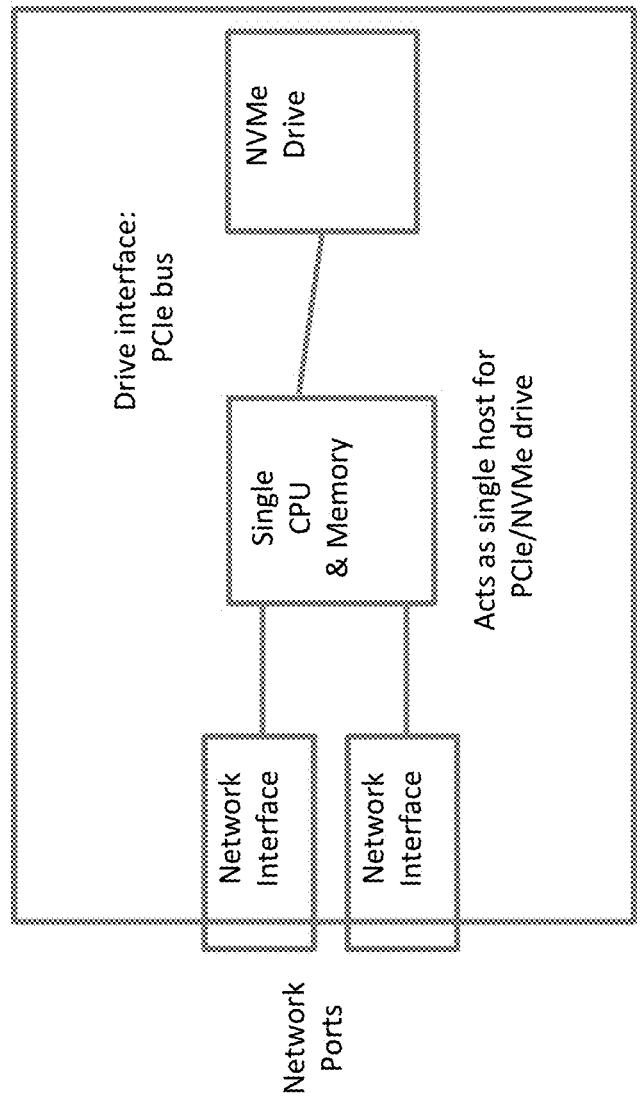
FIG. 3 is a functional block diagram showing how a networked NVMe storage system can be implemented with a simple processor and memory subsystem executing software to provide any-to-any connection capability.

Any-to-any access capability may be implemented with software in a number of different ways. In FIG. 3, a storage system with a simple single computing subsystem is shown with only a single NVMe drive. The any-to-any capability can be provided by software executed by a single processor (CPU) coupled between a pair of network interface ports and the NVMe drive. A single PCIe bus is provided as the drive interface between the processor and the NVMe drive. However, a single computing subsystem with only a single NVMe drive has a number of disadvantages, such as a limited bandwidth and capacity. For larger capacity and performance, a symmetric multiprocessing (SMP) system can be used with software to provide the any-to-any capability.

In FIG. 4A, an NVM storage system is shown with a symmetric multiprocessing (SMP) system is shown coupled between a plurality of network interface ports and a plurality of NVMe drives. The any-to-any capability to the plurality of NVMe drives through the network ports can be provided by software executed by each of the plurality of processors (CPUs) of the SMP system.

In either case of the simple single computing subsystem or the SMP system, the computing subsystem uses software to act as a single host to all the storage devices in the storage system. Using software, the computing subsystem acts as a host to all network ports; performs all the necessary terminations; and performs the any-to-any routing between network ports and storages drives. High performance processors are costly, consume quite a bit of power, and generate much heat that needs to be dissipated and exhausted. Thus, for a large number of network ports and storage devices, the cost and power consumption of the SMP implementation of any-to-any access capability becomes prohibitive or infeasible. For a simpler, lower cost and lower power-constrained implementation such as shown by FIG. 3, the number of storage devices and network ports available is limited in the system, such that performance is not optimal and efficiencies are low. In either case, the use of software further degrades the performance of the SMP implantation or the simple implementation of any-to-any access capability of NVMe drives or devices.

Hardware Implemented any-to-Any Access Capability

Another way of implementing any-to-any access capability in a networked data storage system is with dedicated hardware to improve performance and efficiency, lower costs, and lower power consumption over the alternative implementations.

Figure 5:
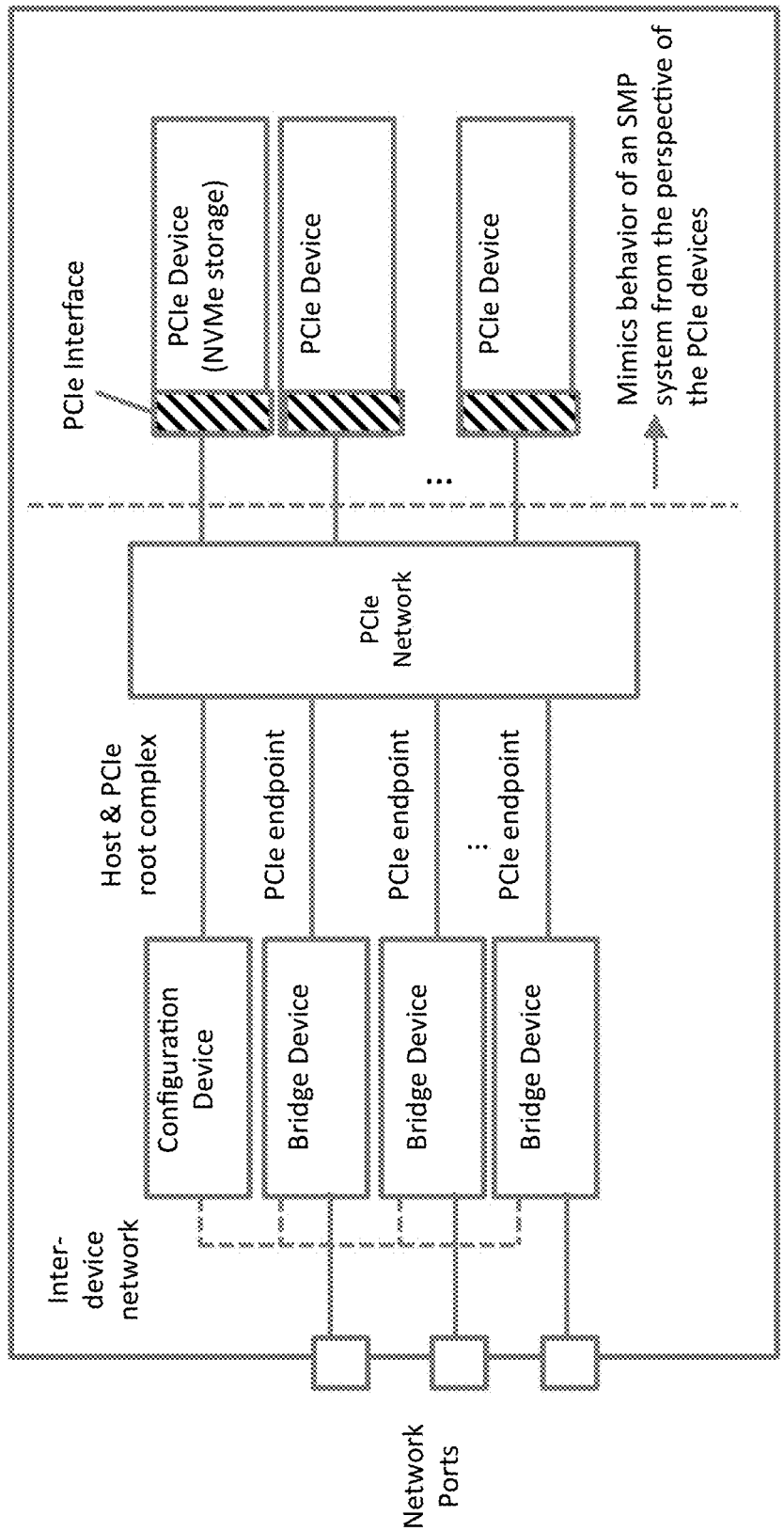
FIG. 5 is a functional block diagram showing how a networked system with any-to-any connection capability is implemented in hardware with collaborative switching devices, such as a configuration device and a bridge device.

Referring now to FIG. 5, the networked data storage system includes a configuration device, one or more bridge devices, a PCIe network, multiple NVME storage devices, and an inter-device network coupled in communication together by the traces of a printed circuit board (e.g., a mother board) or as a method of communication across the PCIe network. The configuration device and the bridge devices may be physically separate components on a motherboard, or they may be different logical units on a single semiconductor device. Each of the NVMe storage devices may be mounted to the mother board or have a PCIe plug that is coupled into a PCIe socket on the mother board or storage device backplane coupled to the printed circuit board traces. With a PCIe plug and socket configuration, the NVMe storage devices can be replaced or added for upgrades or expansion.

As explained further herein, each of the one or more bridge devices includes one or more network interfaces to couple to the physical network ports and one or more PCIe interfaces to couple to one or more PCIe ports. Each of the one or more bridge devices is connected to all of the NVMe storage devices in the networked data storage system by the PCIe network. Generally, the function of the one or more bridge devices is to bridge NVMe commands and data between the network ports and PCIe-devices (NVMe storage devices or drives).

For incoming storage traffic on one or more network ports associated with a bridge device, the bridge device terminates the networking protocol, extracts storage commands and forwards these commands on its PCIe port(s) for one or more of the NVMe storage devices.

The configuration device is coupled to the PCIe network switch and performs management and/or configuration functions for all of the NVMe storage devices. The configuration device functions to configure and initialize the PCIe devices (NVMe storage devices) for the commands and operations that originate from the bridge devices;

The inter-device network couples the configuration device in communication with the one or more bridge devices. The inter-device network can be implemented as a physically distinct network or as a method of communication across the PCIe network between the configuration device and the one or more bridge devices. Accordingly, the configuration device can initialize the bridge devices as PCIe end-points to implement multiple command and data queues for the plurality of NVMe devices in the system. The inter-device network enables additional flow of administration and initialization commands from any of the plurality of network ports through a bridge device to the configuration device for the purpose of processing those commands and subsequent initialization and configuration of the PCIe devices.

Figure 4B:
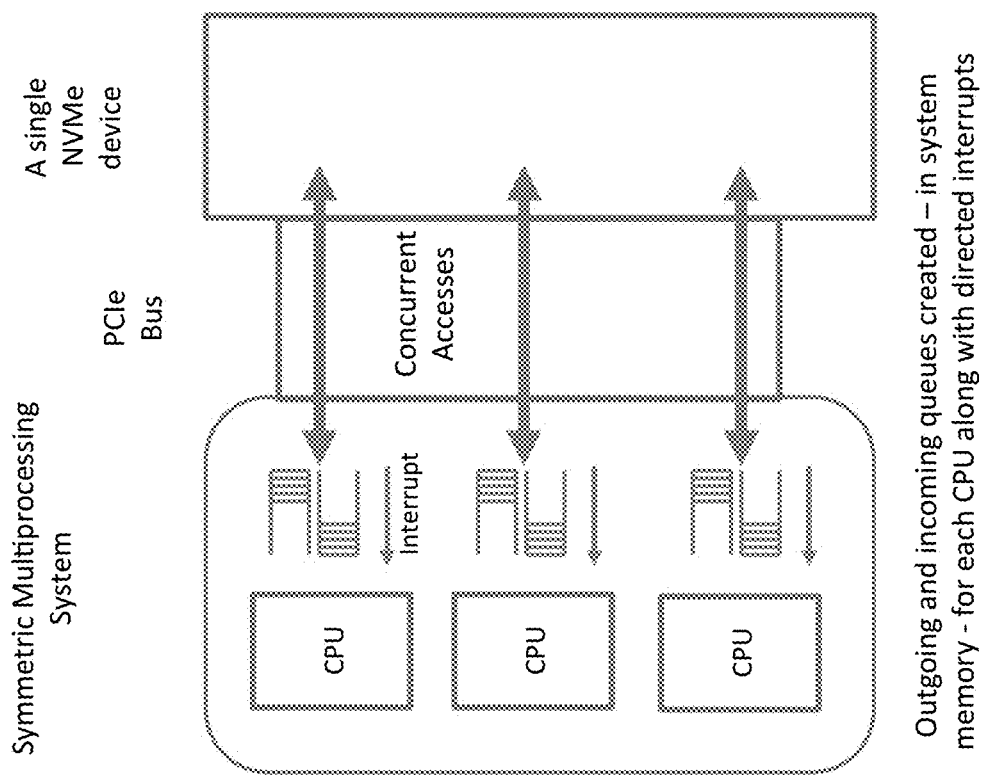
FIG. 4B is a functional block diagram showing how an NVMe device achieves concurrency with multiple processors in an SMP system.

When the networked data storage system goes through a configuration (or reconfiguration) phase, the configuration device acts as a host (also known as a PCIe root-complex) for all of the NVMe storage devices. Ordinarily, the bridge devices—connected to the PCIe switch as PCIe endpoints—would not have access to the storage devices since the devices are only accessible by the host/PCIe root-complex. To address this, the storage system takes advantage of an attribute of NVMe devices that enables concurrency for multiple processors in a SMP system via multiple queues. As shown in FIG. 4B, an SMP system has a queue pair (incoming queue and outgoing queue) in system memory for each processor to provide concurrent access to a single NVMe storage device. Interrupts are used to signal a given processor to load a software process to handle a new entry on an incoming queue.

Figure 9:
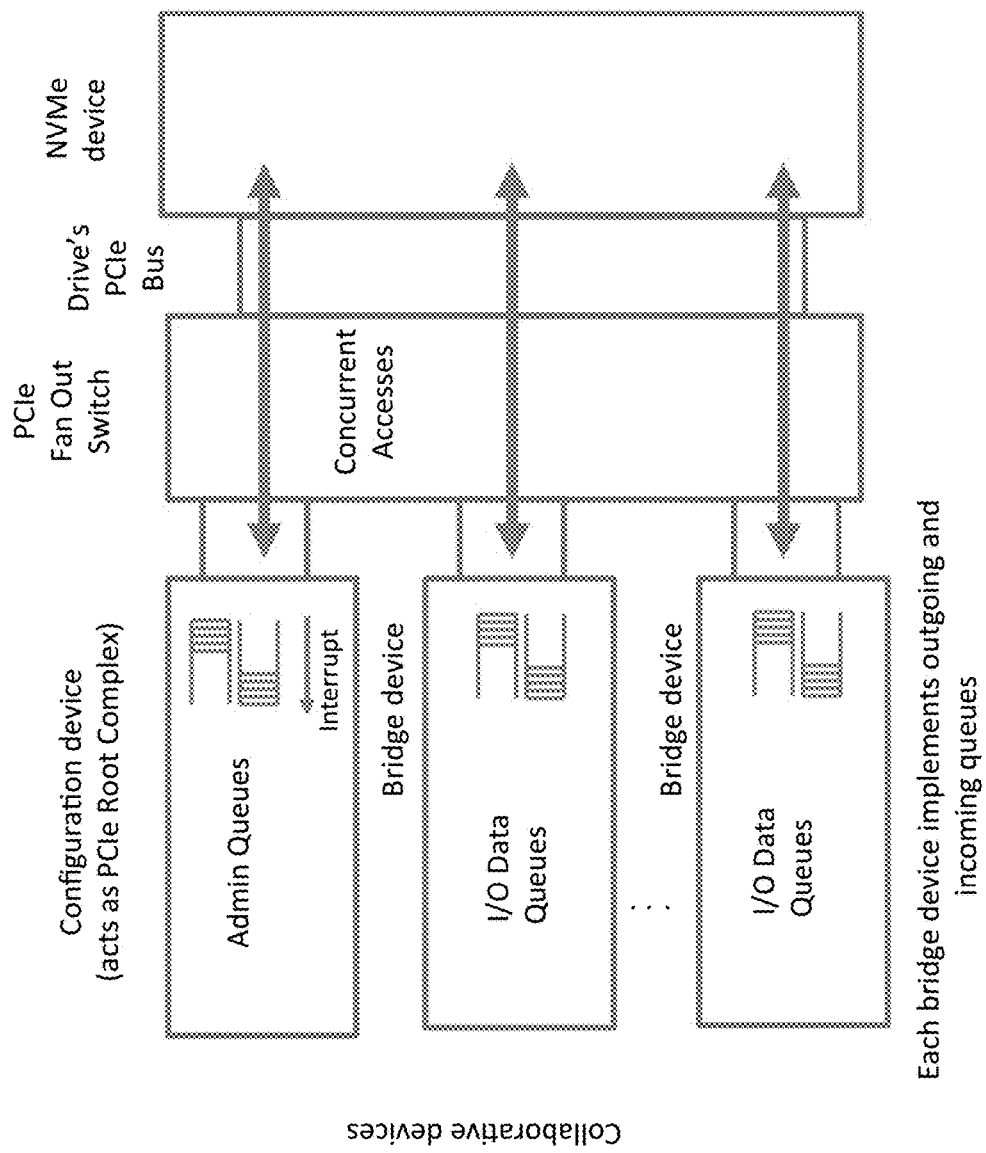
FIG. 9 is a functional block diagram showing how a plurality of collaborative switching integrated circuit devices (hardware devices) can be used to model the behavior of an SMP system executing software and provide any-to-any connection capability to an NVMe device.
Figure 10:
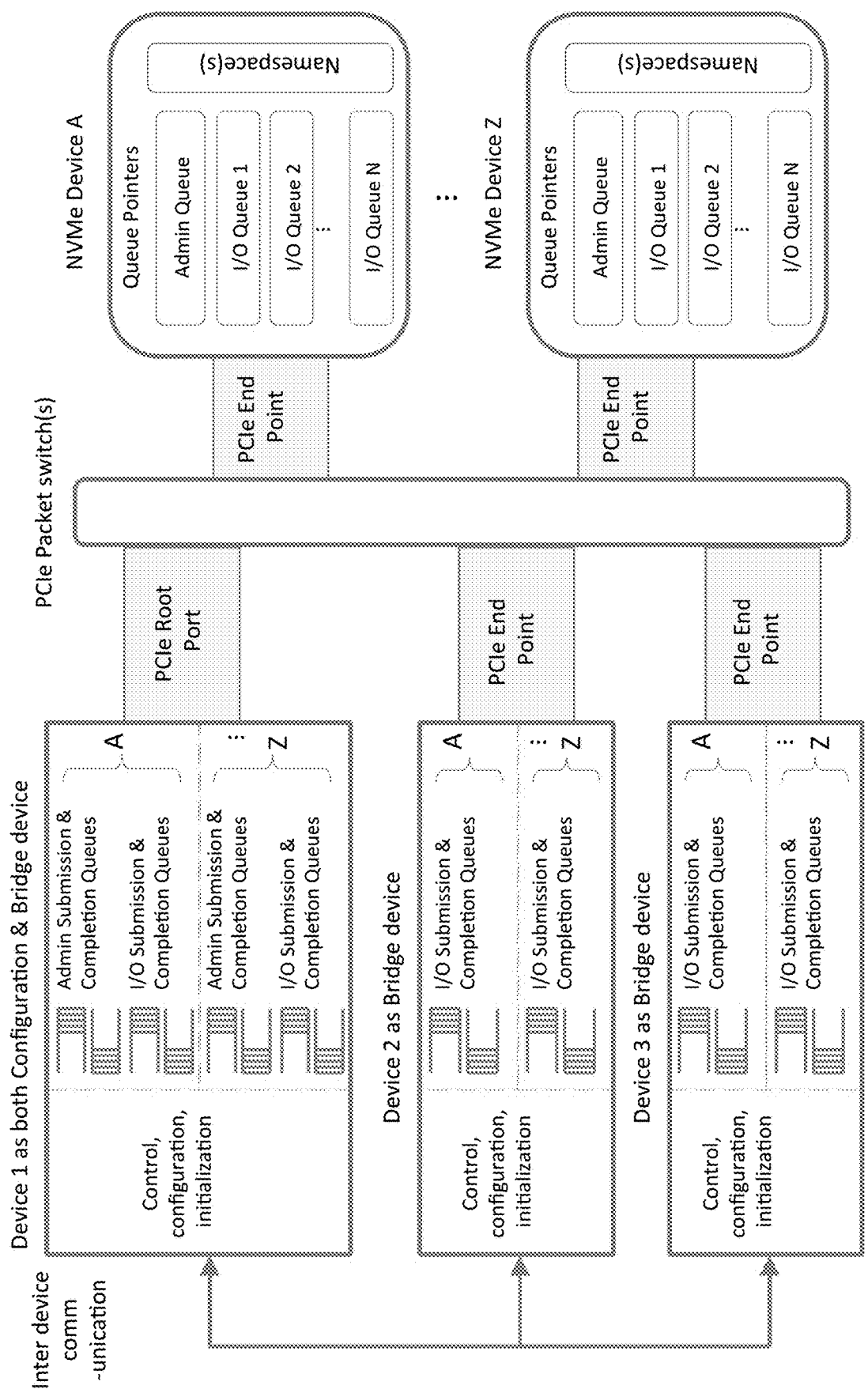
FIG. 10 is a functional block diagram of a networked NVMe storage system illustrating the data queues that are configured across all of the collaborative switching devices to support any-to-any connectivity to the plurality of attached NVMe devices.

From the point of view of the NVMe storage devices, the configuration device and all bridge devices in the networked storage system shown in FIG. 5 collectively mimic the behavior of an SMP system during configuration. Although only the configuration device acts as the PCIe root complex, each of the bridge devices is assigned an I/O data queue pair for every NVMe device as is shown in FIG. 9 and FIG. 10. Each bridge device has an I/O data submission queue and an I/O data completion queue as the date queue pair for every NVMe device. Only the configuration device is capable of initialization and configuration of the NVMe devices. The configuration device performs these operations via communication with the NVMe devices via an admin submission queue and an admin completion queue, but has no data I/O data queues.

In the aggregate, the configuration device and the bridge devices act similar to an SMP system and its software in enabling any-to-any access capability to the NVMe storage devices, but without the cost, complexity and power of an SMP system and without the need for generation and handling of interrupts given the dedicated hardware. The software queues generated in memory by an SMP system and its software are replaced by physical hardware queues formed by addressable registers. Accordingly, the configuration device and the bridge devices collaborate together to provide multiple concurrent queues for each PCIe device and multiple paths between the network ports and PCIe devices to enable the flow of commands and data between any network port and any PCIe device.

Figure 6:
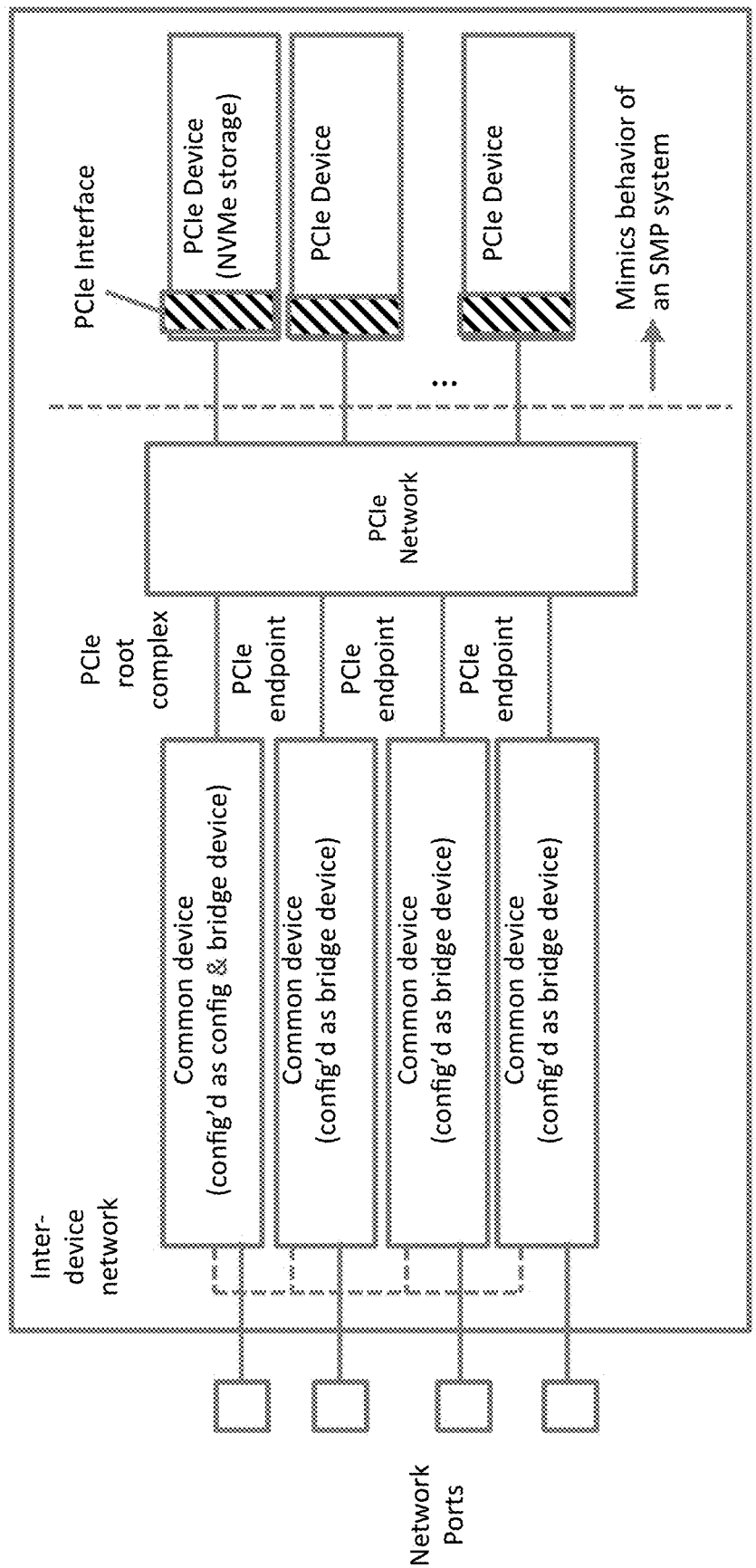
FIG. 6 is a functional block diagram of a networked NVMe storage system with instances of a collaborative switching device (an integrated circuit-field programmable gate array) to provide any-to-any capability.

Referring now to FIG. 6, an alternative embodiment of a networked storage system is shown. This networked storage system includes of a plurality of collaborative switching devices each of which can be a field programmable gate array (FPGA) device with an embedded processor and internal memory. Each collaborative switching device can be configured by an external memory to be either a configuration device, a bridge device, or a combined configuration/bridge device as shown in FIG. 6. Accordingly, each collaborative switching device can act as either a configuration device and/or a bridge device. With this approach, any device can be reprogrammed to assume the role of the configuration device to provide flexibility, redundancy, and high-availability upon any given device failure.

The dedicated collaborative switching devices are smaller, consume less power, and are lower in cost than a high speed general purpose processor that may be used in an SMP system. Accordingly, the several smaller collaborative bridge devices provide a more cost-effective and power-efficient solution over a single large SMP solution. The collaborative switching devices also enable a larger system with more storage devices and network ports over alternative bridge device designs that do not collaborate.

PCIe-Connected Devices

Figure 8:
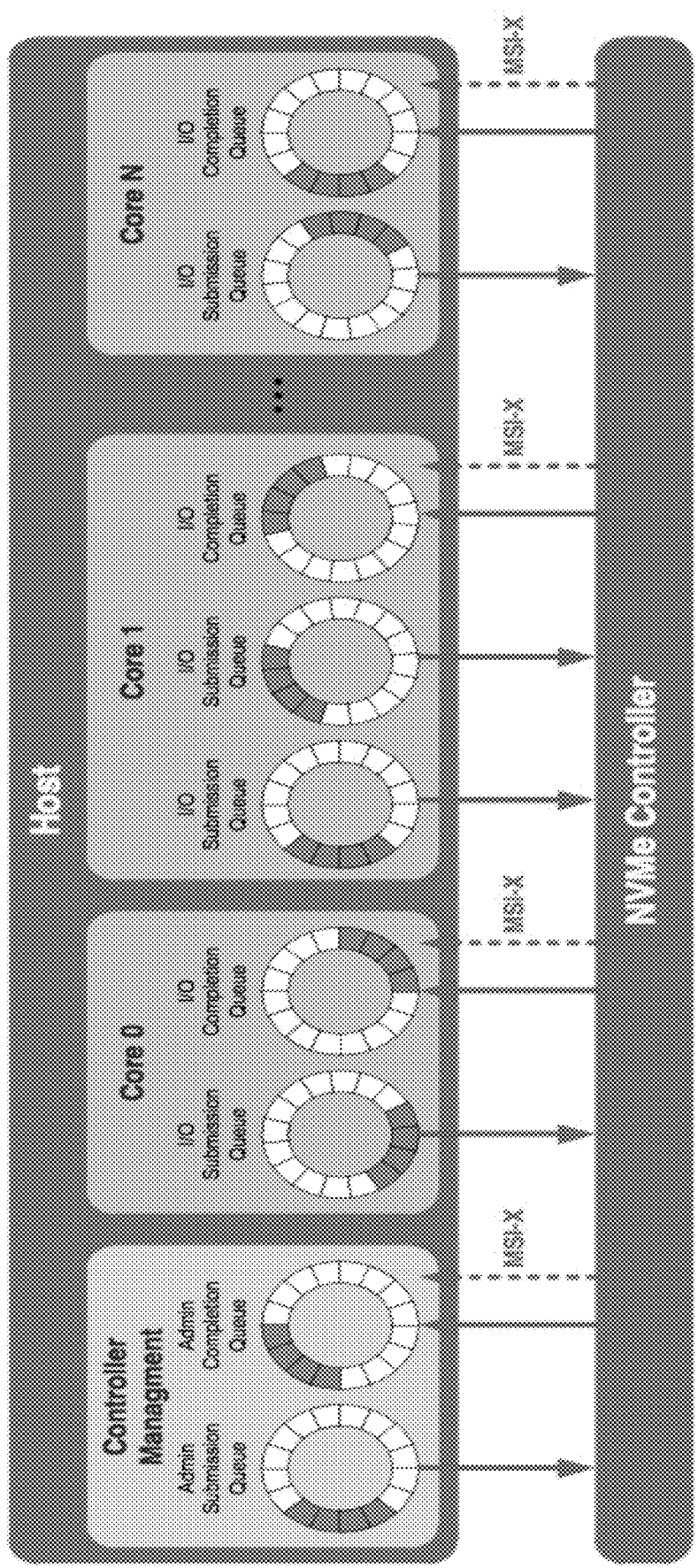
FIG. 8 is a functional block diagram of the data queue structure in network device to support access to NVMe devices in an NVMe networked storage system.

In accordance with one embodiment, the PCIe-connected devices within the networked storage system are NVMe storage devices. The architecture of an NVMe storage device is well known being defined by the specifications in a PCI-SIG industry standard. The specifications describe a set of commands used to configure and access data stored on an NVMe device and it is specifically optimized for concurrent accesses in multiprocessor systems. The host system communicates with the NVMe device via multiple concurrent queues, such as those shown in FIG. 8. The I/O submission queue and I/O completion queue for each NVMe device, as well as the admin submission queue and admin completion queue can be implemented in system memory which is accessible to any device connected to the PCIe fabric. The queue entries can contain pointers to additional data that is also stored in system memory. The plurality of bridge devices (and/or configuration/bridge device) allow the flow of NVMe or similar commands and data between any network port and any PCIe-connected storage device.

The I/O submission queues are used to send commands from the host to the NVMe devices. The I/O completion queues are used for the responses from the NVMe devices to the host. The pair of admin queues are used for configuration and management of a given NVMe device. The pair of admin queues are used by the host to issues admin commands to the NVMe devices to configure other submission and completion data queues for data accesses. These queues are configured for as many processes (bridge devices or processors) as needed for the appropriate level of concurrency desired. Once the data queues have been configured, applications can then issue accesses for data across the multiple queues.

Figure 4C:
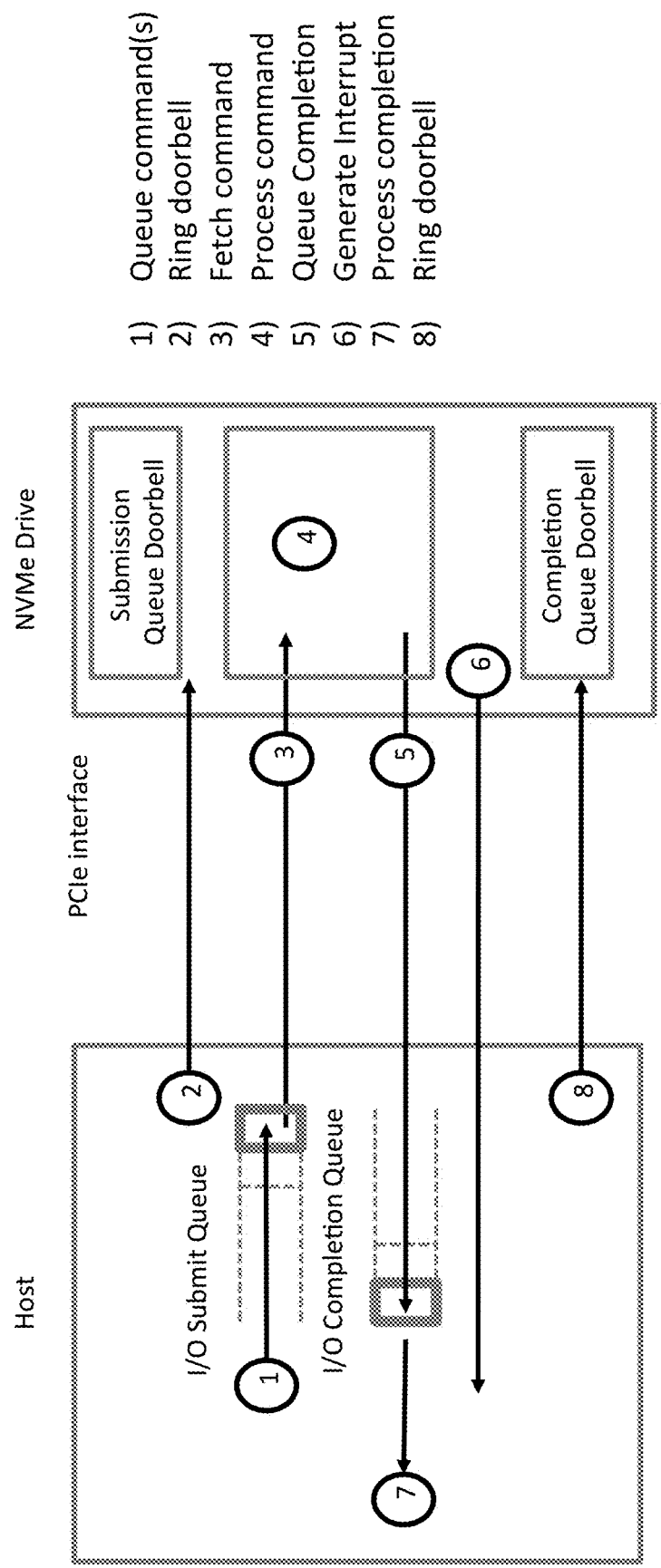
FIG. 4C is a functional block diagram illustrating the sequence of queue operations to support access to an NVMe device in an NVMe networked storage system.
Figure 11:
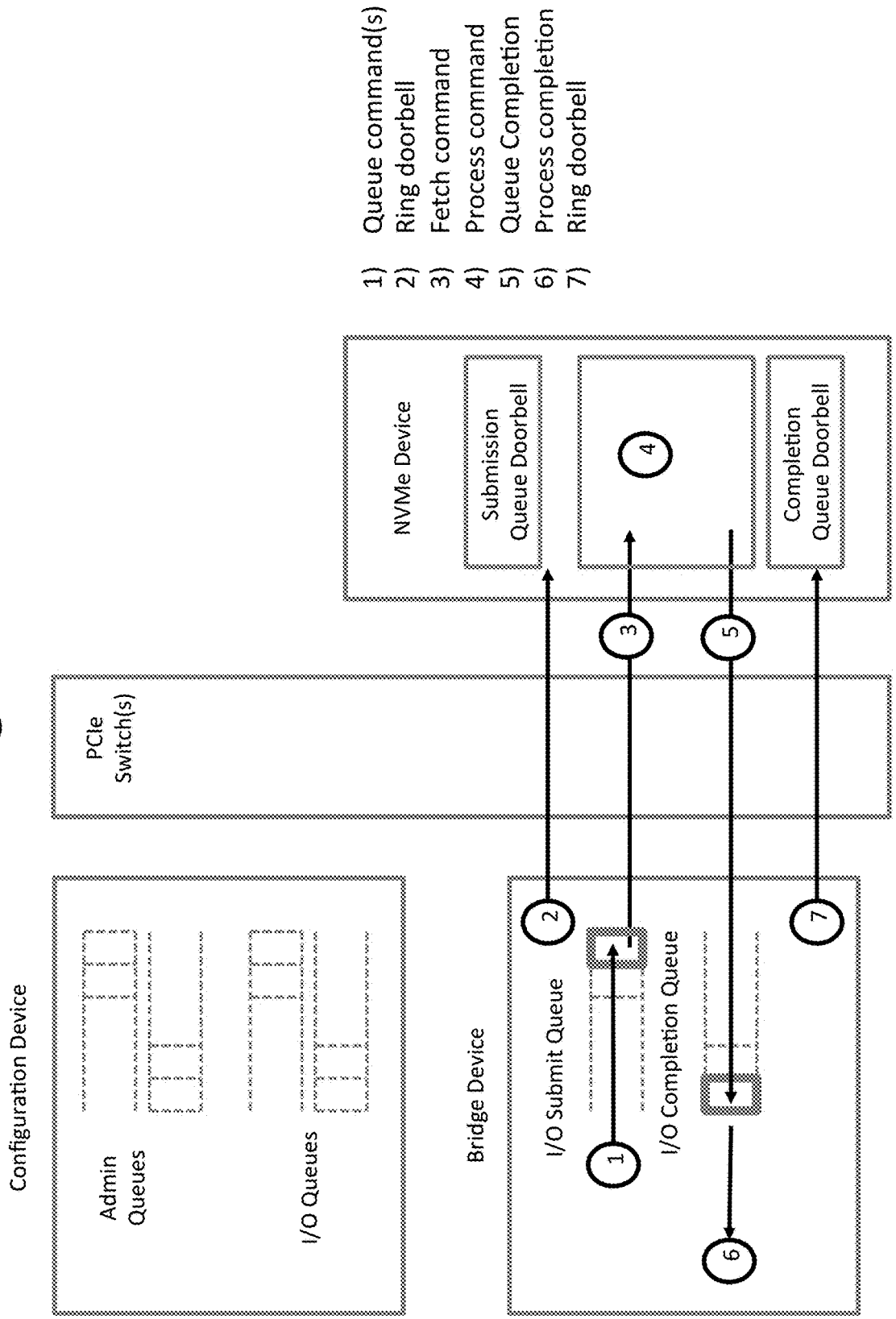
FIG. 11 is a functional block diagram illustrating the sequence of operations of the bridge IC device with an NVMe device through the PCIe switch during an input/output (I/O) operation.

A sequence of command submission and completion operations is shown in FIG. 4C for a software implementation of the any-to-any capability with a plurality of processors in an SMP system. A sequence of command submission and completion operations is shown in FIG. 11 for a hardware implementation of the any-to-any capability with one or more bridge devices, eliminating an inefficient interrupt process. Queues instantiated in hardware are used by the bridge devices and a combined configuration/bridge device to facilitate the flow of data and NVMe commands with the NVMe devices.

Common Collaborative Switching Device

Referring now to FIG. 6, the networked storage system includes a collaborative switching device that can be instantiated multiple times and be flexibly configured to be a configuration device (e.g., see FIG. 7A), a bridge device (e.g., see FIG. 7B), or a combined configuration/bridge device (e.g., see FIG. 7C). In the case of failure, a bridge device may be reconfigured to be a configuration device or a combined configuration/bridge device. The configuration and network processes may be implemented with software executed by an embedded ARM processor. The queue structures may be implemented by a storage array or pointers into memory.

The network interface includes one or network ports and sends/receives physical network packets to/from the network and is responsible for the physical, media, network and transport layers for the given network protocol. It transfers network payload contents to/from to an adjacent function which de-capsulates and forwards NVMe commands on ingress; and encapsulates NVMe responses for transmission on egress. The multiple queues are used for buffering communication between the network and the NVMe devices. The multiple queues are instantiated in each of the device's memory or alternatively the PCIe system memory. For NVMe device access to the entries into these queues, the queues are accessible as PCIe system memory via a PCIe interface. The PCIe interface includes one or more PCIe ports which can be configured as either a PCIe root-port (when configured as a configuration device) or end-point (when configured as just a bridge device).

All devices include a management function. When configured as a configuration device, the management function manages the NVMe devices via the PCIe interface and communicates with the management functions of other bridge devices by the inter-device network (IDN) and an IDN interface. When configured as a bridge device, the management function is responsible for taking commands from the configuration device and managing its internal functions accordingly (e.g., queue configuration). The inter-device network could be implemented as a physically distinct network or as a method of communication across the PCIe network. The inter-device network between devices enables the flow of administration and initialization commands from any of the plurality of network ports to the device configured to function as the sole configuration device.

The configuration device may fail. The failure of the configuration device can be detected by known methods, such as a self test. The collaborative switching devices are flexible such that one of the remaining collaborative switching devices may be assigned and configured to be the configuration device or assigned and reconfigured from a bridge device to be the configuration device.

Initialization of Collaborative Devices and Configuration

As shown in FIG. 6, the networked NVMe storage system includes the multiple collaborative switching devices that are configured during power up. One of these collaborative switching devices is configured as the configuration device. Upon power-on, the configuration device assumes the role of host and root-complex of the overall PCIe fabric. The configuration device's PCIe port (or one of its ports if there are more than one) acts as a root-port. The other collaborative switching devices are configured upon power up into bridge devices that are configured as PCIe end-points. As host, the configuration device performs PCIe enumeration and NVMe device discovery during the power-on initialization sequence. During initialization, all bridge devices remain dormant and await configuration commands from the configuration device. If the configuration device is not functional after power-on (after a time-out period) or fails during operation, one bridge device can take-over the master role reconfiguring itself into a configuration device to provide a degree of high-availability. During this failure scenario, the collaborative switching device reconfigures itself and its PCIe interface to be a root-port.

During its initialization, the configuration device becomes aware of how many NVMe devices are connected to the PCIe fabric—either via discovery or via persistent configuration data. For each NVMe device, the configuration device performs a number of actions. The configuration device creates an admin submission queue and an admin completion queue in the device's memory. The configuration device initializes the NVMe device via direct PCIe register programming to configure access to the configuration device's admin queues. Then, via the inter-device network, the configuration device commands each bridge device to create the corresponding I/O submission and I/O queues. For every bridge device in the system, the configuration device sends a create I/O submission queue command and a create I/O completion queue command to the NVMe device with the appropriate parameters to enable access to the queues created across the configuration and bridge device's memory. The sequence of operations above is repeated for every NVMe device in the system.

At the end of the aggregate sequence of operations, the configuration device contains an admin queue pair for every NVM device in the system. Each bridge device (whether a combined configuration/bridge device or dedicated bridge device) contains one or more I/O submission queues and one I/O completion queues for every NVMe device in the system such as shown in FIG. 10. Each NVMe device in the system is appropriately configured for concurrent I/O access by every bridge device via the configured queues.

Description of I/O Operations

Once a bridge device's queues and associated NVMe device have been initialized by the configuration device, I/O data operations can occur between the bridge device and the NVMe device without further participation from the configuration device. The independent operation of the bridge device after initialization provides high-performance and low-latency when reading or writing data with the NVMe device.

FIG. 11 illustrates a sequence of actions between a bridge device and NVMe device to complete a data I/O operation. In comparison with the data I/O operation of FIG. 4, the hardware solution is more efficient in that it at least eliminates an interrupt generation process used in the software solution. In the hardware sequence of data I/O operations, the bridge device initially places an NVMe command into the I/O submission queue, such as an NVMe read request or NVMe write request. The associated NVMe device is notified of the new queue entry via a PCIe write from the bridge device to the storage device's submission queue doorbell. The storage device retrieves the NVMe command from the I/O submission queue by issuing a PCIe read from the NVMe device to the bridge device. The NVMe command is processed by the NVMe storage device. If NVMe command is an NVMe read request, the data at the requested address is retrieved and sent to the bridge device as NVMe completion data. The storage device places NVMe completion data into the I/O completion queue via a PCIe write from the NVMe device to the bridge device.

The bridge device processes the data from the I/O completion queue. The bridge device's queue structure detects the PCIe write to the completion queue and initiates the data processing without any system interrupt. The bridge device can detect PCIe writes using various available methods such as a hardware-based detection mechanism or a software polling mechanism.

This approach with the bridge device is different from SMP systems that rely on a system interrupt to the host/root-complex notifying software to process the new queue entry. Because the bridge device detects PCIe writes from the PCIe device into its I/O completion queues, it can proceed to operate and extract the entries placed into the I/O completion queue. This foregoes the need to forward interrupt requests sent from the PCIe device to the configuration device. With the bridge device, any interrupts from the NVMe device are unnecessary and can be disabled or simply ignored.

When the data in the I/O completion queue has all been processed, the bridge device notifies the storage device that it has retrieved the data from the completion queue. A PCIe write from the bridge device to the storage device's completion queue doorbell occurs to indicate the NVMe read request process has been completed.

CONCLUSION

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

For example, the text describes and the figures show how any-to-any connection capability can be provided for a plurality of NVMe storage devices residing in a networked NVMe storage system. However, that implementation of the any-to-any connection capability can also be used to provide any-to-any capability for any PCIe-connected device that communicates via multiple queues. For example, the NVMe storage devices can instead by PCIe-connected Graphics Processing Unit (GPU) accelerator devices. Also note that while the above structure is described for NVMe commands, it is generic and can be used for any command set that supports multiple concurrent queues in PCIe memory of a PCIe interface device.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A networked system comprising:
a plurality of network interface ports to couple to a computer data network to transmit outgoing network traffic and receive incoming network traffic;
a plurality of PCIe devices for coupling in communication with the computer data network and supporting a function of the computer data network;
a plurality of bridge devices respectively coupled to the plurality of network interface ports, each bridge device to receive a portion of the incoming network traffic and transmit a portion of the outgoing network traffic through a respective network interface port, each bridge device including
a network interface to couple to the network interface ports to receive incoming network packets associated with one or more NVMe storage devices and transmit outgoing network packets associated with one or more client computers,
a PCIe interface to couple to the PCIe network switch and in communication with the plurality of NVMe drives, and
an NVMe command processor/router coupled to the network interface, the NVMe command processor/router to de-capsulate network packets into NVMe commands and data and steer the NVMe commands and data towards the associated NVMe storage devices through the PCIe network switch, the NVMe command processor/router to encapsulate NVMe commands and data from the associated NVMe storage devices into network packets and steer the network packets towards the associated one or more client computers through the network interface;
a PCIe network switch coupled to and between the plurality of bridge devices and the plurality of PCIe devices, the PCIe network switch to route PCIe packets between the plurality of bridge devices and the plurality of PCIe devices; and
a configuration device coupled in communication with the plurality of bridge devices, the configuration device further coupled in communication with the plurality of PCIe devices by the PCIe network switch, the configuration device to configure and initialize the plurality of PCIe devices for commands and operations that originate from the plurality of bridge devices associated with the incoming network traffic from the computer data network.

2. The networked system of claim 1, further comprising:
an inter-device network coupled between the configuration device and the plurality of bridge devices, the inter-device network to enable administration commands and initialization commands to be communicated from any of the plurality of network ports to the configuration device for processing and subsequent initialization and configuration of one or more of the plurality of PCIe devices.

3. The networked system of claim 1, wherein
the configuration device, the plurality of bridge devices, and the PCIe network switch collaborate together to provide multiple communication paths between the network ports and the plurality of PCIe devices to provide any-to-any connectivity.

4. The networked system of claim 1, wherein
the plurality of PCIe devices are PCIe storage devices.

5. The networked system of claim 1, wherein
from a perspective of the plurality of PCIe devices, the configuration device and the plurality of bridge devices collaborate together in a manner that mimics the behavior of a symmetric multi-processing system with a plurality of processors executing software.

6. The networked system of claim 1, wherein
each of the plurality of bridge devices includes multiple concurrent data queues to enable the flow of commands and data between any network port and any PCIe device.

7. The networked system of claim 6, wherein
the configuration device includes a plurality of administrative queues for each and every bridge device.

8. A networked system comprising:
a plurality of network interface ports to couple to a computer data network to transmit outgoing network traffic and receive incoming network traffic;
a plurality of PCIe devices for coupling in communication with the computer data network and supporting a function of the computer data network;
a plurality of collaborative switching devices each including a programmable gate array, the plurality of collaborative switching devices configured to be a plurality of bridge devices respectively coupled to the plurality of network interface ports, each bridge device to receive a portion of the incoming network traffic and transmit a portion of the outgoing network traffic through a respective network interface port, each bridge device including
a network interface to couple to the network interface ports to receive incoming network packets associated with one or more NVMe storage devices and transmit outgoing network packets associated with one or more client computers,
a PCIe interface to couple to the PCIe network switch and in communication with the plurality of NVMe drives, and
an NVMe command processor/router coupled to the network interface, the NVMe command processor/router to de-capsulate network packets into NVMe commands and data and steer the NVMe commands and data towards the associated NVMe storage devices through the PCIe network switch, the NVMe command processor/router to encapsulate NVMe commands and data from the associated NVMe storage devices into network packets and steer the network packets towards the associated one or more client computers through the network interface;
a PCIe network switch coupled to and between the plurality of bridge devices and the plurality of PCIe devices, the PCIe network switch to route PCIe packets between the plurality of bridge devices and the plurality of PCIe devices; and
wherein a first collaborative switching device of the plurality of collaborative switching devices is configured to be a configuration device coupled in communication with the plurality of bridge devices, the configuration device further coupled in communication with the plurality of PCIe devices by the PCIe network switch, the configuration device to configure and initialize the plurality of PCIe devices for commands and operations that originate from the plurality of bridge devices associated with the incoming network traffic from the computer data network.

9. The networked system of claim 8, wherein
the first collaborative switching device configured to be the configuration device fails; and
a second collaborative switching device that is initially configured to be a bridge device is reconfigured to be the configuration device.

10. The networked system of claim 8, wherein
the first collaborative switching device configured to be the configuration device is further configured to be a combined configuration and bridge device coupled to a network interface port and the PCIe network switch, the combined configuration and bridge device further to receive a portion of the incoming network traffic and transmit a portion of the outgoing network traffic through the network interface port to which it is coupled.

11. The networked system of claim 10, wherein
the first collaborative switching device configured to be the combined configuration and bridge device fails; and
a second collaborative switching device that is initially configured to be a bridge device is reconfigured to be the combined configuration and bridge device.

12. The networked system of claim 8, wherein each bridge device further includes
an inter-device network interface to couple to the computer data network in communication with all other bridge devices of the plurality of bridge devices;
a plurality of queue pairs coupled to the NVMe command processor/router, the plurality of queue pairs to store NVMe commands and data respectively associated with the plurality of NVMe storage devices; and
a network management processor coupled to the NVMe command processor/router, the plurality of queue pairs, the inter-device network, and the PCIe interface, the network management processor to receive inter-device communication and collaborate with all other bridge devices in performing network operations and providing any-to-any connection access between client computers and the plurality of NVMe storage devices over the computer data network, the network management processor further controlling the flow of NVMe commands and data between the network interface and the PCIe interface through the plurality of queue pairs.

13. The networked system of claim 8, wherein the configuration device includes
a PCIe interface to couple to the PCIe network switch and in communication with the plurality of NVMe drives;
an inter-device network interface to couple to the computer data network in communication with all other bridge devices of the plurality of bridge devices;
an NVMe command processor/router coupled to the network interface, the NVMe command processor/router to steer NVMe commands and data towards the associated NVMe devices through the PCIe network switch, the NVMe command processor/router to steer NVMe commands and data towards the other bridge devices through the inter-device network interface;
a plurality of queue pairs coupled to the NVMe command processor/router, the plurality of queue pairs to store NVMe commands and data respectively associated with the plurality of NVMe storage devices; and
a configuration and network management processor coupled to the NVMe command processor/router, the plurality of queue pairs, the inter-device network, and the PCIe interface, the configuration and network management processor to configure and initialize the PCIe interface devices of the NVMe storage devices, the configuration and network management processor to initialize the plurality of bridge devices through the inter-device network interface.

14. The networked system of claim 8, further comprising:
a memory device coupled to the first collaborative switching device and the plurality of collaborative switching devices, wherein the first collaborative switching device and the plurality of collaborative switching devices are respectively configured to be a configuration device and a plurality of bridge devices by the data in the memory device.

15. A method for a networked system coupled in communication with a computer data network, the method comprising:
configuring a plurality of collaborative switching devices to be a plurality of bridge devices respectively coupled to a plurality of network interface ports, each bridge device to receive a portion of incoming network traffic to the plurality of network interface ports, each bridge device to transmit a portion of outgoing network traffic through a respective network interface port, each bridge device including
a network interface to couple to the network interface ports to receive incoming network packets associated with one or more NVMe storage devices and transmit outgoing network packets associated with one or more client computers,
a PCIe interface to couple to the PCIe network switch and in communication with the plurality of NVMe drives, and
an NVMe command processor/router coupled to the network interface, the NVMe command processor/router to de-capsulate network packets into NVMe commands and data and steer the NVMe commands and data towards the associated NVMe storage devices through the PCIe network switch, the NVMe command processor/router to encapsulate NVMe commands and data from the associated NVMe storage devices into network packets and steer the network packets towards the associated one or more client computers through the network interface;
configuring another collaborative switching device to be to be a first configuration device coupled in communication with the plurality of bridge devices, the first configuration device further coupled in communication with a plurality of PCIe interface devices of a plurality of NVMe devices by a PCIe network switch, the first configuration device to configure and initialize the plurality of PCIe devices for commands and operations that originate from the plurality of bridge devices associated with the incoming network traffic from the computer data network;
routing PCIe packets between the plurality of bridge devices and the plurality of PCIe interface devices of the plurality of NVMe devices; and
collaborating the operation of the configuration device, the plurality of bridge devices, and the PCIe network switch together to provide multiple communication paths between the network interface ports and the plurality of PCIe interface devices to provide any-to-any connectivity between the computer data network and the plurality of NVMe devices.

16. The method of claim 15, further comprising
detecting failure of the first configuration device; and
reconfiguring one of the plurality of bridge devices to be a second configuration device.

17. The method of claim 15, further comprising:
initializing the plurality of PCIe interface devices of the NVMe devices with a plurality of queues associated with multiple concurrent data queues in the plurality of bridge devices to enable the flow of commands and data between any network port and any PCIe interface device.

18. The method of claim 17, wherein
the first configuration device includes a plurality of administrative queues for each and every bridge device.

19. The method of claim 15, wherein
receiving administration commands and initialization commands at any network interface port;
forwarding the administration commands and initialization commands from any network interface port to the first configuration device;
processing the administration commands and initialization commands; and
initializing and configuring one or more PCIe interface devices of the plurality of NVMe devices.

20. The method of claim 15, further comprising:
initializing the configuration device as a host and PCIe root complex;
initializing and configuring the plurality of PCIe devices with the configuration device;
initializing the plurality of bridge devices as PCIe endpoints with multiple command and data queues to support a plurality of NVMe devices.

* * * * *